Feb. 12, 1963 W. R. GARNETT 3,077,536
TWO-WAY LIGHTING FIXTURE
Filed April 12, 1961 2 Sheets-Sheet 1
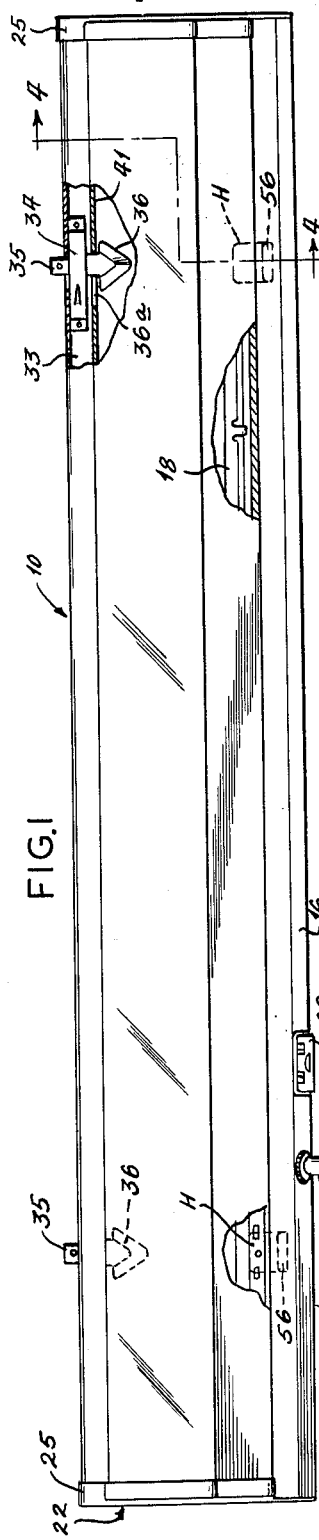
FIG.1
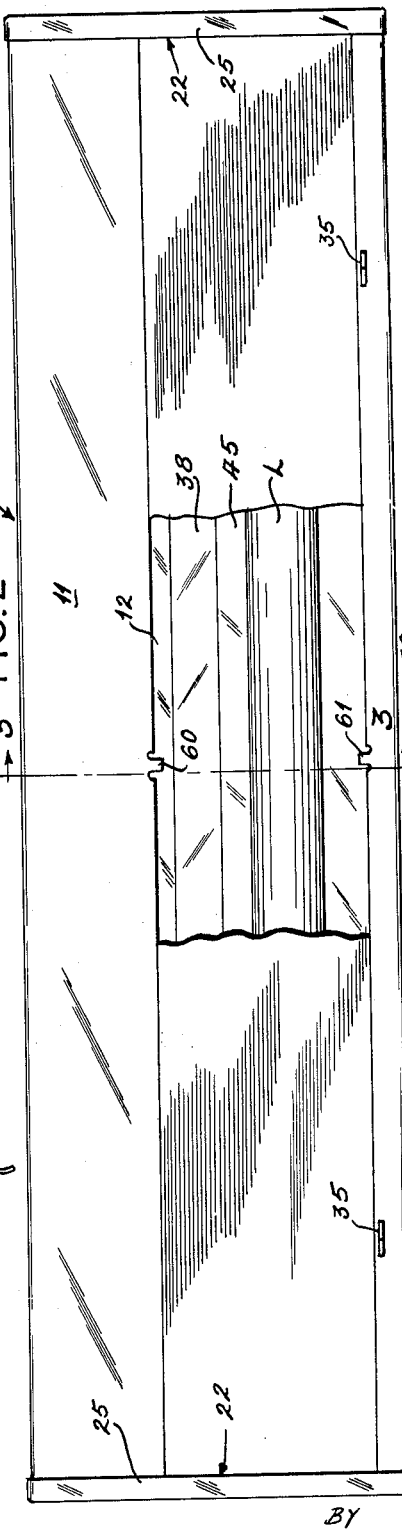
FIG.2
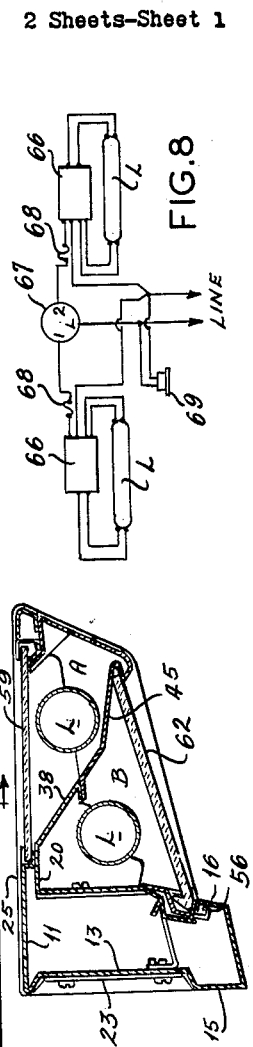
FIG.8
FIG.3
INVENTOR:
WILLARD R. GARNETT
BY Gravely, Lieder & Woodruff
ATTORNEYS.

Feb. 12, 1963  W. R. GARNETT  3,077,536
TWO-WAY LIGHTING FIXTURE
Filed April 12, 1961  2 Sheets-Sheet 2

INVENTOR:
WILLARD R. GARNETT
BY Gravely Sieder & Woodruff
ATTORNEYS.

United States Patent Office 3,077,536
Patented Feb. 12, 1963

3,077,536
TWO-WAY LIGHTING FIXTURE
Willard R. Garnett, Bellefontaine Neighbors, Mo., assignor to Day-Brite Lighting, Inc., St. Louis, Mo., a corporation of Missouri
Filed Apr. 12, 1961, Ser. No. 102,577
5 Claims. (Cl. 240—73)

This invention relates to improvements in lighting fixtures and is particularly directed to a fixture having alternate or two-way illumination provisions of a unique character.

Room lighting fixtures are generally constructed to provide direct illumination or indirect illumination depending upon the use to which the fixture is directed. Some lighting fixtures combine both functions in a way which does not truly serve the purposes, since the direct illumination types do not completely avoid some stray lighting effects, and the indirect illumination types also have some stray lighting effects. These prior fixtures produce harsh lighting results which is fatiguing to the eyes and is objectionable to people situated near by.

The present lighting fixture achieves substantially complete control of illumination of either direct or indirect character without harsh effect, whereby the ability to change the mood of a room or occupied space is especially controlled in a unique and novel manner. An important use for lighting fixtures of the present invention is in hospitals where light properly applied transforms the atmosphere into a cheerful one which assists the patient and provides different sources of lighting. It frequently happens that one patient desires direct illumination and another only indirect or soft illumination, but this is not available with presently known fixtures.

Accordingly it is an object of this invention to provide a lighting fixture with selectively useable light sources so that either direct illumination or indirect illumination, and both types of illumination are readily available in a unitary assembly of simple construction.

It is also an object of this invention to construct a lighting fixture with alternately or conjointly useable sources of illumination which are so arranged that each source may be isolated from the other.

A further object of this invention is to provide a lighting fixture with a simple system of baffles in a compact housing whereby illumination of either direct or indirect character is obtained without complication, and wherein the fixture may be easily serviced and cleaned.

Other objects and advantages will become apparent from the disclosure of a presently preferred embodiment of a lighting fixture having the components and features of assembly illustrated in the accompanying drawings, wherein:

FIG. 1 is a front elevational view of the lighting fixture assembly forming the subject of this invention, portions being shown in section;

FIG. 2 is a top plan view of the fixture with a portion broken away;

FIG. 3 is a transverse sectional elevational view seen at line 3—3 in FIG. 2;

FIG. 8 is a wiring diagram for two-way illumination control of the lamps for direct and indirect service, and for simultaneous service.

Figure 6:
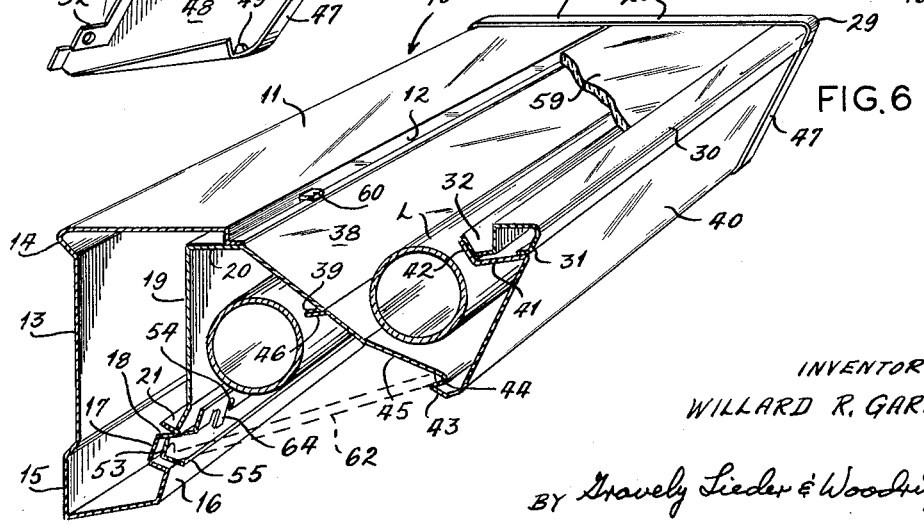
FIG. 6 is a perspective view of a fragmentary portion of the assembly.

With reference to FIGS. 1, 2 and 6 in particular, and other views as noted, the preferred embodiment of the lighting fixture includes an elongated housing or body 10 having an upper wall 11 with a front flange 12 and a rear vertical wall 13 inwardly off-set to provide an upper longitudinal rib 14 and a lower longitudinal channel-like portion 15. The channel-like portion 15 is formed with a front up-turned flange 16 and an angular channel 17 terminating in an up-turned lip 18, the channel 17 and lip 18 being normally concealed in use. The body space houses the necessary electrical wiring, ballast, and other components which are not illustrated for convenience. These components are concealed within the body by an elongated cover plate 19 formed with an elongated upper flange 20 engaged with the flange 12 and a lower flange 21 engaged on the angular channel 17 inwardly of lip 18. The opposite ends of the body 10 are closed by cover members 22, a typical example of which is shown in FIG. 7.

Figure 4:
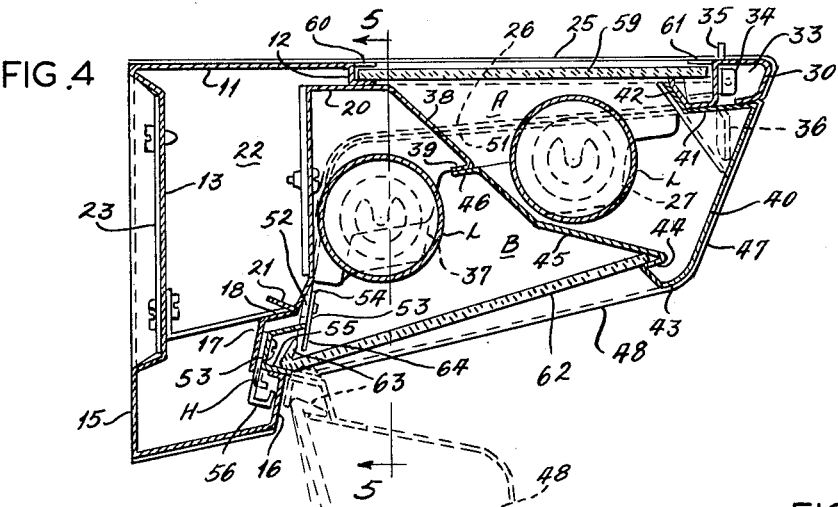
FIG. 4 is an enlarged transverse sectional view seen at line 4—4 in FIG. 1 and having a movable portion of the assembly shown in dotted outline.
Figure 5:
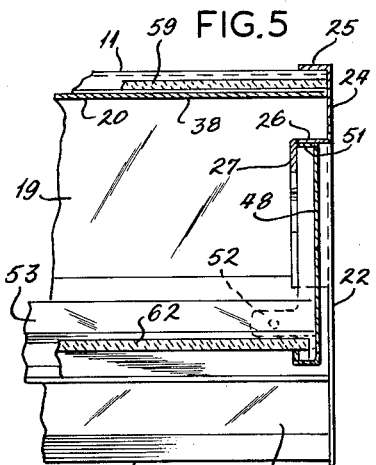
FIG. 5 is a fragmentary sectional view seen at line 5—5 in FIG. 4.
Figure 7:
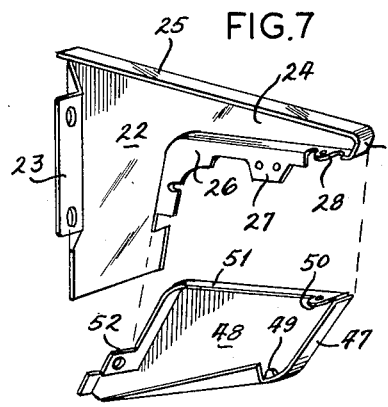
FIG. 7 is a further perspective view of the end cap components of the fixture shown in an exploded relation.

As may be seen best in FIGS. 4, 5 and 7, each cover member 22 is formed with an attachment ear 23 secured to the rear wall 13, the ear 23 being formed with the cover wall which conforms with the shape of the body 10. The cover member 22 is provided also with a forwardly extending portion 24 which is tapering in form and has the upper flange 25 as a part thereof. A formed flange 26 is provided along the lower margin of portion 24, and this formed flange has a depending ear 27 and a tab 28 thereon. The front portion of flange 25 is curved at 29 for a purpose to appear.

In FIGS. 1, 2 and 6 it can be seen that the forwardly extending portions 24 of the opposite cover members 22 are spaced apart a distance equal to the length of the body 10. The outer ends of these extending portions 24 are interconnected by a rail 30 (FIGS. 4 and 6) having a lower inturned lip 31 and an angular flange 32 carried at the inner side of the upper surface of the rail 30 and spaced from the lip 31, as shown. Thus, the rail 30 is hollow and provides an internal space 33 to receive and enclose snap catches 34 in spaced relation (FIG. 1). Each catch 34 is provided with a release element 35 operably connected to a detent element 36.

In the fixture thus far described, the body 10 carries the end covers 22, each having the projecting portions 24 which are interconnected by the rail 30 fitted within the rolled flange ends 29. The rail is secured to the tabs 28 by a suitable element engaged in an end portion of the rail lip 31 and engaged in the aperture of the lip. This assembly is stationary, being suitably affixed to the room surface by means not shown. The assembly supports a pair of lamps L by suitable sockets S one being carried on plates 37 (FIG. 4) secured to the inner surfaces of the end cover flanges 26, and one being attached to the ear 27. The lamps L extend longitudinally in front of the cover wall 19 and are spaced apart so that a partial baffle plate 38 (FIG. 4) may extend angularly between the lamps L. The baffle 38 terminates in a lip 39 and may constitute an integral portion of the cover 19.

The fixture is provided with a removable and hingedly connected assembly constructed as follows: a front face member 40 extends longitudinally of the fixture adjacent the rail 30 and is formed with an inturned flange 41 having the angular lip 42 which mates with rail lip 32 to form a light seal with the rail. The lower margin of the face member 40 is rolled under in a curved channel 43 having a step 44 therein, and a baffle portion 45 is integral with the channel 43 and step 44. The baffle portion 45 extends angularly upwardly and terminates in a lip 46 which abuts the lip 39 of the stationary baffle portion 38. There is thus formed a complete baffle member extending diagonally or angularly between the lamps L within the fixture and a light seal is effected at the abutting lips 39 and 46. It is, of course, understood that either or both baffle portions 38 and 45 may be formed as separate components and attached respectively to the body cover 19 and the face member 40.

The ends of the face member 40 are engaged within the marginal flanges 47 of respective end caps 48, and the caps (FIG. 7) are attached by a prong 49 engaged in a suitable aperture in the channel 43, and by a threaded element engaged in the tab 50 after penetrating the channel 43. The cap 48 also is formed with a marginal flange 51 which follows the contour of flange 26 on the stationary cap 22 to form a light seal along the length thereof (FIG. 4). The lower inner end of flange 51 is provided with a tab 52 (FIGS. 4, 5 and 7) which secures the end of a hinge rail 53, the rail 53 extending lengthwise of the fixture and being of such shape in section as to fit within the channel 17. As best seen in FIGS. 4 and 6, the hinge rail 53 has an upwardly extending flange 54, and a spaced lower flange 55 which provides a seat surface. The hinge rail 53 carries a pair of hinge members H having the hooked elements 56 which pass through suitable slots in the channel 17 so as to hook thereover when the movable assembly is moved to the dotted line position of FIG. 4 after the catch detents 36 have been released from engaging in the slots 36a (FIG. 1) formed in the flange 41 of the face member 40.

There is thus constructed a fixture having a stationary assembly of parts and a hingedly connected assembly of parts (FIG. 4), such parts cooperating to form separate spaces A and B for the respective lamps L. The spaces A and B are separated by the cooperating baffle portions 38 and 45. Space A is enclosed along the upper side by a suitable transparent or translucent panel 59 which covers the opening formed between the body flange 12 and latch rail 30 and between the end caps 22. As shown in FIGS. 2, 4, 5 and 6, the longitudinal margins of panel 59 rest upon flange 12 and upon the lip 42 in rail 30, and the end margins are inserted under the end cap flanges 25 by slightly bowing the panel. The center of the panel 59 is engaged by a holding tab 60 struck from flange 12, and by a similar tab 61 struck from the rail 30. The movable assembly carries a panel 62 within the bottom opening of lamp space B, the panel 62 being seated in the step 44 of the face member 40 and having a flange margin 63 seated upon seat surface 55 of the hinge rail 53 with the flanged margin 63 held by one or more tabs 64 struck from the flange 54.

In FIG. 8, the wiring diagram includes lamps L connected to individual ballasts 66, an electrical power supply denoted "line," and a selector switch 67 wired into the ballasts 66 through suitable fuses 68. If desired, the fixture may be provided with a separate outlet receptacle or plug-in base 69. This provision being shown in FIGS. 1 and 8 as a circuit independent of the switch 67 for use without illuminating lamp L being energized. The selector switch 67 is a common type position switch adapted to sequentially energize the lamp L for providing down-light in the space B (FIG. 3), the lamp L in space A for up-light, and both lamps L for simultaneously providing down-light and up-light.

The fixture of this invention, in its presently preferred form, consists in a normally stationary body structure having means projecting forwardly from the body and forming the top, and part of the ends and front of an illuminating lamp chamber, and a hingedly or movably mounted closure assembly for the chamber having means forming the bottom and part of the ends and front of the chamber. The fixture also embodies light reflecting baffle means in the chamber and arranged in divided relation so that part is carried by the stationary body and part is carried by the closure assembly. The baffle is arranged to divide the lamp chamber into two illuminating spaces each with a lamp so that one or the other, or both lamps may be used, and when used singly there will be no undesired light leakage.

There has been set forth in the foregoing description a presently preferred lighting fixture assembly which illustrates the features of the invention. It is, of course, understood that the assembly of the fixture and components thereof may be varied from the precise form disclosed without departing from the principles of the improvement, and all such variations and modifications are intended to be included within the scope of the annexed claims.

What is claimed is:

1. A lighting fixture including a normally stationary body having means extending from one side to form the top and part of the front and ends of a chamber for illuminating lamps, lamps mounted in said chamber in spaced relation, a closure assembly movably carried by said stationary body and having means forming the bottom and part of the front and ends of the chamber for the illuminating lamps, a first light transmitting panel carried by said top means adjacent one of said lamps, a second light transmitting panel carried by said bottom means adjacent another lamp, and common baffle means in the fixture extending between said lamps and dividing the lamp chamber into separate spaces each associated with a panel and isolating such spaces from each other.

2. A lighting fixture including a normally stationary body having means extending from one side to form the top and part of the front and ends of a chamber for illuminating lamps, lamps mounted in said chamber in spaced relation, a closure assembly movably carried by said stationary body and having means forming the bottom and part of the front and ends of the chamber for the illuminating lamps, a light transmitting panel carried by each of said top and bottom means, and common baffle means in the fixture extending between said lamps and dividing the lamp chamber into two spaces one of which includes said panel in the bottom and the other said panel in the top, said baffle means being divided adjacent said lamps so that a portion moves with said closure assembly to expose the whole chamber for access to said lamps upon movement of said closure assembly.

3. A lighting fixture including a normally stationary body having means extending from one side to form the top and part of the front and ends of a chamber for illuminating lamps, lamps in said chamber in spaced relation, a closure assembly hingedly carried by said stationary body and having means forming the bottom and part of the front and ends of the chamber for the illuminating lamps, a light transmitting panel carried by each of said top and bottom means, and means in the fixture extending between said spaced lamps and dividing the lamp chamber into a plurality of lamp spaces, said means comprising a baffle member carried by said closure assembly in position to abut a part of said stationary body, said baffle member being movable with said closure assembly to expose said lamps from the same side of said fixture.

4. A lighting fixture including: a body structure having opposite end members projecting outwardly to the same side and an element interconnecting the outer ends of said members to define an opening, a first light transmitting panel carried in said opening; a closure assembly hingedly connected to said body structure and having end caps and an interconnecting face means spaced from said body structure to abut said element, a second light transmitting panel carried in said closure assembly, the fixture having a chamber therewithin defined by said panels, face means and body structure; a split baffle in said chamber having a portion fixed to said body structure and a portion fixed to said closure assembly, said portions dividing the chamber into adjacent but independent spaces each in light communication to the ambient space through a panel; and an illuminating lamp mounted in each space adjacent a panel, said split baffle maintaining said lamps isolated from each other.

5. A lighting fixture including an elongated body, cover members on the opposite ends of said body projecting outwardly therefrom to the same side, a frame element interconnecting said members and spaced from said body, a closure assembly hingedly connected to said body and extending outwardly therefrom to said frame element, means releasibly securing the outward portion of said closure assembly adjacent said frame element, a first panel carried by said body and frame element between said cover members, a second panel carried in said closure assembly spaced from said first panel to define with said frame element, cover members and closure assembly a chamber within said fixture, lamps mounted in said chamber in spaced relation, and baffle means dividing said chamber into separate spaces each containing a lamp, a first portion of said baffle means being carried by said hinged closure assembly so as to move therewith upon opening said closure assembly to expose said lamps for service and said panels being light transmitting to emit light, another portion of said baffle means being carried by said body and having an abutment surface engaged by said first portion of said baffle means to prevent light leakage between said separate spaces.

References Cited in the file of this patent

UNITED STATES PATENTS

| | | |
|---|---|---|
| 1,258,898 | Hawthorne | Mar. 12, 1918 |
| 1,630,621 | Laventore | May 31, 1927 |
| 2,215,531 | Pieper | Sept. 24, 1940 |
| 2,897,348 | Akely et al. | July 28, 1959 |
| 2,998,508 | Bobrick | Aug. 29, 1961 |
| 3,007,038 | Anisfield | Oct. 31, 1961 |

FOREIGN PATENTS

| | | |
|---|---|---|
| 921,846 | France | Jan. 20, 1947 |